Patented Dec. 23, 1930

1,786,281

UNITED STATES PATENT OFFICE

FREDERICK C. ZOBEL, OF BROOKLYN, NEW YORK

RUBBERLIKE COMPOSITION AND PROCESS OF MAKING SAME

No Drawing.    Application filed January 23, 1926.    Serial No. 83,388.

My invention consists in a new and improved composition having substantially the physical properties of rubber which can be used for all purposes for which natural rubber is now used, together with a process for making same. I am aware that many efforts have been made to devise a substitute for rubber. Few, if any, of them have been successful and those that have been successful are prohibitive in cost.

With my process, I obtain a substance which is elastic, durable and has substantially all the physical properties of rubber and can be used for all purposes for which rubber is used and can be mixed with pure rubber and can be produced at a cost much less than that of real rubber or of any substitute for rubber that has been heretofore produced.

My invention consists in mixing gum copal with hard wood tar creosote oil, and heating sufficiently to bring the mass into solution. I pour the solution into a petroleum naptha, such for example, commercially known as varnoline. On pouring the solution of gum copal and hard wood oil into the naphtha, the mass coagulates and separates out leaving an amorphous solid mass which may be at this state more or less sticky. The mass can be washed with water, if desired, which removes the traces of naphtha. The mass may then be kneaded until it becomes of the required consistency for commercial purposes.

The following is an example of one way of carrying out the invention although I am not limited thereto. Take two parts of hard wood creosote oil such as that obtained by the distillation of beech, birch, or maple also known as hard wood creosote oil, to one part of gum copal such as manila copal, heat the mixture until it becomes soluble and then precipitate the mixture into five parts of petroleum naphtha such as is known by the trade-name of varnoline. When stirred around, the mass coagulates and the desired product is then removed from the naphtha and washed with water for the purpose of removing all traces of naphtha. The kneading may be done by hand or in a regular rubber washing machine.

The product so obtained is a rubber like mass whose color may vary from light canary color to an almost black. The product is very elastic, regaining its original form when stretched even though to a considerable degree. It is soluble in the usual rubber solvents such as carbon-tetra-chlorid and carbon bisulphide and on evaporating in such a solution, the original rubber mass is obtained.

In acetone it slowly disintegrates, part of it dissolving, the other part staying in the acetone as a white, sticky solid which as long as wet with acetone easily pulls into threads, is elastic and in general shows rubber-like properties.

The rubber like substance can be used for erasing pencil marks, etc. with the same facility and the same result as natural rubber. When heated up in water, it becomes softer and on cooling regains the original elasticity and texture.

I claim:—

1. As a new article of manufacture, a composition having substantially the physical properties of soft rubber and obtainable by the interaction of gum copal, hard wood creosote oil and petroleum naphtha.

2. As a new article of manufacture, a composition having substantially the physical properties of soft rubber, comprising a product obtained by mixing gum copal and hard wood creosote oil and precipitating the mixture with petroleum naphtha.

3. As a new article of manufacture, a composition of matter having substantially the physical properties of soft rubber, comprising a product obtainable by heating a mixture of gum copal and hard wood creosote oil until a clear solution is formed, and causing precipitation by the addition of petroleum naphtha, said composition being insoluble in water, partly soluble in acetone and soluble in carbon bisulphide.

4. The process of forming a composition having substantially the physical properties of rubber, which comprises mixing gum copal and hard wood creosote oil and causing precipitation by the addition of petroleum naphtha.

5. The process of forming a composition having substantially the physical properties of rubber, which comprises mixing gum copal and hard wood creosote oil, heating the mixture until a clear solution is formed, and causing precipitation by the addition of petroleum naphtha.

6. The process of forming a composition having substantially the physical properties of rubber, which comprises mixing gum copal and hard wood creosote oil, heating the mixture until a clear solution is formed, pouring the solution into petroleum naphtha whereby a precipitation takes place, removing the precipitate so formed, kneading and washing it.

7. The process of manufacturing a composition having substantially the physical properties of rubber, which comprises mixing one part of gum copal to two parts of hard wood creosote oil, heating the two until a solution is formed, pouring the solution into five parts of petroleum naphtha while stirring and removing the precipitate formed.

In testimony whereof I have hereunto set my hand.

FREDERICK C. ZOBEL.